US005685053A

United States Patent [19]

Deonarine et al.

[11] Patent Number: 5,685,053

[45] Date of Patent: Nov. 11, 1997

[54] DELABELING METHOD

[75] Inventors: Victor Deonarine, Macedonia, Ohio; Gerard Bernard Doyle, Liverpool, England

[73] Assignee: Illinois Tool Works Inc., Glenview, Ill.

[21] Appl. No.: 449,690

[22] Filed: May 24, 1995

[51] Int. Cl.[6] .......... B23P 19/02

[52] U.S. Cl. .......... 29/426.4; 29/822; 156/584; 83/53; 134/34

[58] Field of Search .......... 29/426.1, 426.3, 29/426.4, 235, DIG. 50; 83/53, 177; 134/144, 148, 151, 32, 34; 15/60, 61; 156/247, 248, 344, 584

[56] References Cited

U.S. PATENT DOCUMENTS

| | | | |
|---|---|---|---|
| 3,689,973 | 9/1972 | Leenaards | 29/426.4 X |
| 3,924,315 | 12/1975 | Cady et al. | 29/426.3 X |
| 4,717,442 | 1/1988 | Hopson | 156/344 X |
| 4,834,826 | 5/1989 | Abe et al. | 156/344 |
| 5,217,538 | 6/1993 | Buchholz et al. | 134/148 X |
| 5,317,794 | 6/1994 | Lerner et al. | |
| 5,373,618 | 12/1994 | Doyle et al. | |
| 5,433,057 | 7/1995 | Lerner et al. | |
| 5,442,851 | 8/1995 | Lerner et al. | 29/426.1 X |

*Primary Examiner*—Peter Vo
*Assistant Examiner*—Khan Nguyen
*Attorney, Agent, or Firm*—Watts, Hoffmann, Fisher & Heinke Co., L.P.A.

[57] ABSTRACT

A method of removing labels utilizing an associated delabeling apparatus has a spaced pair of label removal stations for alternatively receiving inline objects from a supply conveyor. Each station includes a carrier carrying a set of spaced fluid jet cutters each at a cutting location for registration with a labeled object. An actuator is connected to the carriers for alternatively moving them from respective start to stop positions and return to traverse each cutter from a bottom to a top end of a registered label to cut it end to end. Each location has a fluid nozzle positioned to emit a stream of fluid against a label being removed and a friction finger element to assist in label removal.

9 Claims, 7 Drawing Sheets

DELABELING METHOD

TECHNICAL FIELD

This invention relates to bottle delabelers, and more particularly, to a high-speed automatic delabeler especially suited for removing tubular plastic labels from bottles and a method of label removal.

CROSS-REFERENCES

U.S. patent application Ser. No. 07/789257 filed Nov. 7, 1991 by Hershey Lerner et al entitled "High-Speed Sleever," now U. S. Pat. No. 5,483,783, issued Jan. 16, 1996(here the Labeler Patent).

U.S. Pat. No. 5,317,794 issued Jun. 7, 1994 entitled "Method of Delabeling"(here the Delabeler Patent).

BACKGROUND OF THE INVENTION

Plastic labels are enjoying increasing use for labeling beverage and other bottles. Many of these labels are of a wrap-around type, each of which is adhesively secured to its bottle. Plastic labels in the form of tubular sleeves, each of which is slid over the bottle are being used in increasing quantities.

Until recently, the major advantage of wrap-around labels has been their low-cost achieved by high-speed labeling machines that have had greater throughput than sleeving machines. With the advent of the machine of the Labeler Patent, wrap-around labels no longer enjoy economic advantage over tubular sleeves. Indeed, given that the glue accounts for approximately eight percent of their cost, wrap-around labels are now more expensive. This is especially true if one takes into account the fact that, if there is a labeling malfunction with a glue-on label, both bottle and label are typically thrown away while, with the sleeve labels, the label is removed and another label is applied to the bottle.

A major advantage of tubular sleeve labels is that they can be removed from bottles to enable total recycling of both the bottle and the label. Wrap-around labels, on the other hand, make it impractical to fully recycle such things as a labeled plastic bottle because the label cannot be economically separated from the bottle, and the label and bottle are typically made of different materials, namely polyethylene for labels and P.E.T. for the bottles.

The Delabeler Patent discloses and claims a turret type machine for removing labels from bottles. With this machine the turret carries a series of spaced delabeling stations which successively receive bottles from a supply conveyor and transport them to a discharge conveyor as the labels are concurrently removed from the bottles.

Each delabeling station includes a differential cutter which cuts the relatively soft plastic of a plastic label top to bottom while not cutting or otherwise marring the bottle being delabeled. Where the label is polyethylene or similar material, the inherent elasticity of the label contracts the label once cut, thus widening the cut and concurrently tending to sever any physical adherence of the label to the bottle. As the turret continues to rotate with its cut labels, they pass a label collecting mechanism.

The differential cutter of the Delabeler Patent is a water jet which is traversed vertically from top to bottom of the label to effect label-cutting action. While the novel differential cutter mechanisms of the Delabeler Patent were thought to provide one of the outstanding features of the invention, in use they have not always been fully satisfactory.

The problem exhibited by the cutter mechanisms of the Delabeler Patent has been that it has proved difficult to provide long-lasting effective seals between reciprocating parts with the high water pressures developed by those mechanisms. In addition, while the machine of the Delabeler Patent has enjoyed commercial success, it is a relatively expensive machine to manufacture and there remains a need for a lower cost, simpler machine capable of delabeling large numbers of vessels quickly and efficiently.

SUMMARY OF THE INVENTION

In a delabeler made in accordance with this invention, a pair of elongated parallel delabeling stations are provided. Inline sets of juxtapose vessels to be delabeled are alternately and sequentially fed to the stations. Labels of a set of bottles in one of the stations are concurrently cut by jet cutters of a set which are respectively aligned with the vessels. After the vessels of a set in the first station have had their labels removed, a new set of vessels to be delabeled are fed from a supply conveyor into the first station, pushing the delabeled bottles from the station in the process. Concurrently with the feed of a new set of vessels to the first station, labels of a set of bottles registered in the second station are cut. Once the labels in the second station have been removed, a new set of bottles is fed to the second station as labels are again cut in the first station. This process repeats sequentially and continuously.

When the delabeling machine is in use a high pressure pump operates continuously to cause cutting jets of water to be continuously emitted by each of the cutters. Since the jets are only used when labels are being cut, each station includes a jet deflector that is movably mounted on a jet cutter carrier. Each deflector is movable relative to its associated carrier from a jet blocking position when labels are not being cut to a jet exposed position as label cutting is performed. The deflectors are maintained in their respective positions by springs that bias the deflectors against locating stops. As a nozzle carrier reaches the lower end of its vertical travel, its deflector is cammed in an over-center action from its blocking to its jet exposed position. When a cutter carrier reaches the top of its travel, its deflector is cammed back in a reverse over-center action to its blocking position.

One of the outstanding features of the machine of this invention is that the cutters during a cutting operation are elevated vertically to cut labels from the bottom to the top. As a label cut progresses when cutting a polyethylene or other sleeve type label having inherent resiliency, the cut releases tension in the label and the edges of the cuts commence to separate. As the cutting action nears completion the label will on occasion slide downwardly of the vessel once its internal tension has been released. By cutting bottom to top, one is assured of cutting the label from one end to the other while with a top to bottom cutting action on occasion a label will slide down a bottle, especially if it is a smooth walled cylindrically contoured bottle, until a lower portion of the label is out of the cutter path of travel with the result that a complete end-to-end cut is not obtained.

Another of the features of the machine of this invention is that where non-cylindrical bottles are being cut the cutters are nonetheless maintained at a substantially constant distance from the label being cut as the cutters effect their vertical cutting traversals. To this end template-like cams are provided which are contoured to the contour of vessels being delabeled. A cam follower coupled to the cutter carrier coacts with the cam to shift the cutters horizontally as they effect their vertical traversal and thus maintain the cutters in substantially constant spaced relationship with the contoured bottles.

To assist in label removal, flush nozzles and frictional fingers are preferably provided. A set of flush nozzles are provided at each of the work stations. The number of flush nozzles is equal to the number of cutters and each flush nozzle is associated with a different one of the cutters. The nozzles are each positioned, relative to an associate vessel located in a station, at a position diametrically opposed to its associated cutter.

Each delabeling station includes a friction stripper assembly. The assembly includes a rotatable shaft and a set of friction finger elements mounted on the shaft. Each of these elements is positioned below and aligned with an associated one of the flush nozzles. The stripper shafts of the two stations are each mounted on a spaced pair of carriers that are pivotally supported and shiftable alternatively between stripping positions in the first station and the second station. When in the stripping position at one of the stations, the stripper of that station is rotated so that its friction fingers sequentially engage labels being cut to assist in label removal.

Accordingly, the objects of this invention are to provide a novel and improved delabeling machine and a method of delabeling.

DESCRIPTION OF THE PREFERRED EMBODIMENT

Figure 1:
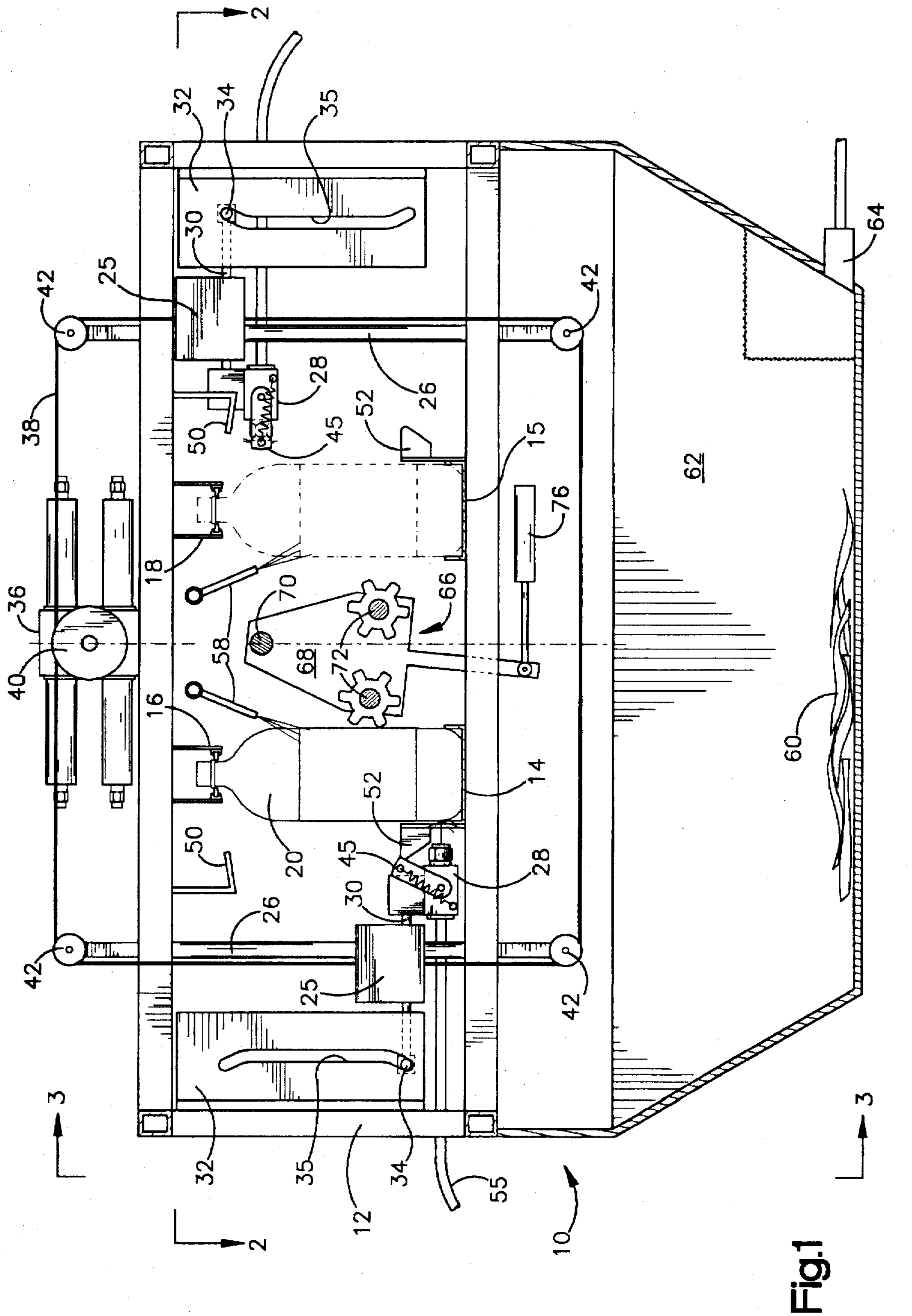
FIG. 1 is a vertical sectional view of the machine as seen from the plane indicated by the line 1—1 of FIG. 3.

Referring to the drawings a delabeler machine is shown generally at 10. The machine includes a frame 12. A pair of support tracks 14, 15 are supported on and connected to the frame, respectively delineating bottle supports and guides for a spaced pair of parallel work stations. A pair of bottle neck supports 16, 18 are provided. The neck supports 16, 18 are respectively above and associated with the support tracks 14, 15 for maintaining bottles 20 upright as they are moved into the respective work stations, delabeled and subsequently removed from the stations.

Each work station has a carrier support 25 mounted on a spaced pair of upright carrier support guides 26 for vertical reciprocation. Each station has an elongate cutter carrier 28. Support rods 30 are slidably supported by the carrier supports 25. The carriers 28 are in turn supported by the support rod 30.

Each work station includes a spaced pair of cutter positioning cams 32. Each support rod 30 carries, at its outer distal end, a cam follower 34. The cam followers 34 each project into and coact with an associated cam slot 35 respectively formed in each of the cams 32.

An hydraulic actuator 36 is mounted atop the frame 12. A flexible cable 38 is connected to a rotary output 40 of the actuator 36. The cable 38 is trained around four pulleys 42 and connected to the carrier supports 25 of each of the work stations. When the actuator output 40 rotates in a clockwise direction as viewed in FIG. 1, the carrier support 25 of the left-hand station as viewed in FIG. 1 is elevated, while the support 25 of the right-hand station is lowered. Thus clockwise rotation will move the supports 25 from the position shown in FIG. 1 to the position shown in FIG. 5. Counterclockwise rotation returns the supports 25 from the position of FIG. 5 to the position of FIG. 1.

Figure 2:
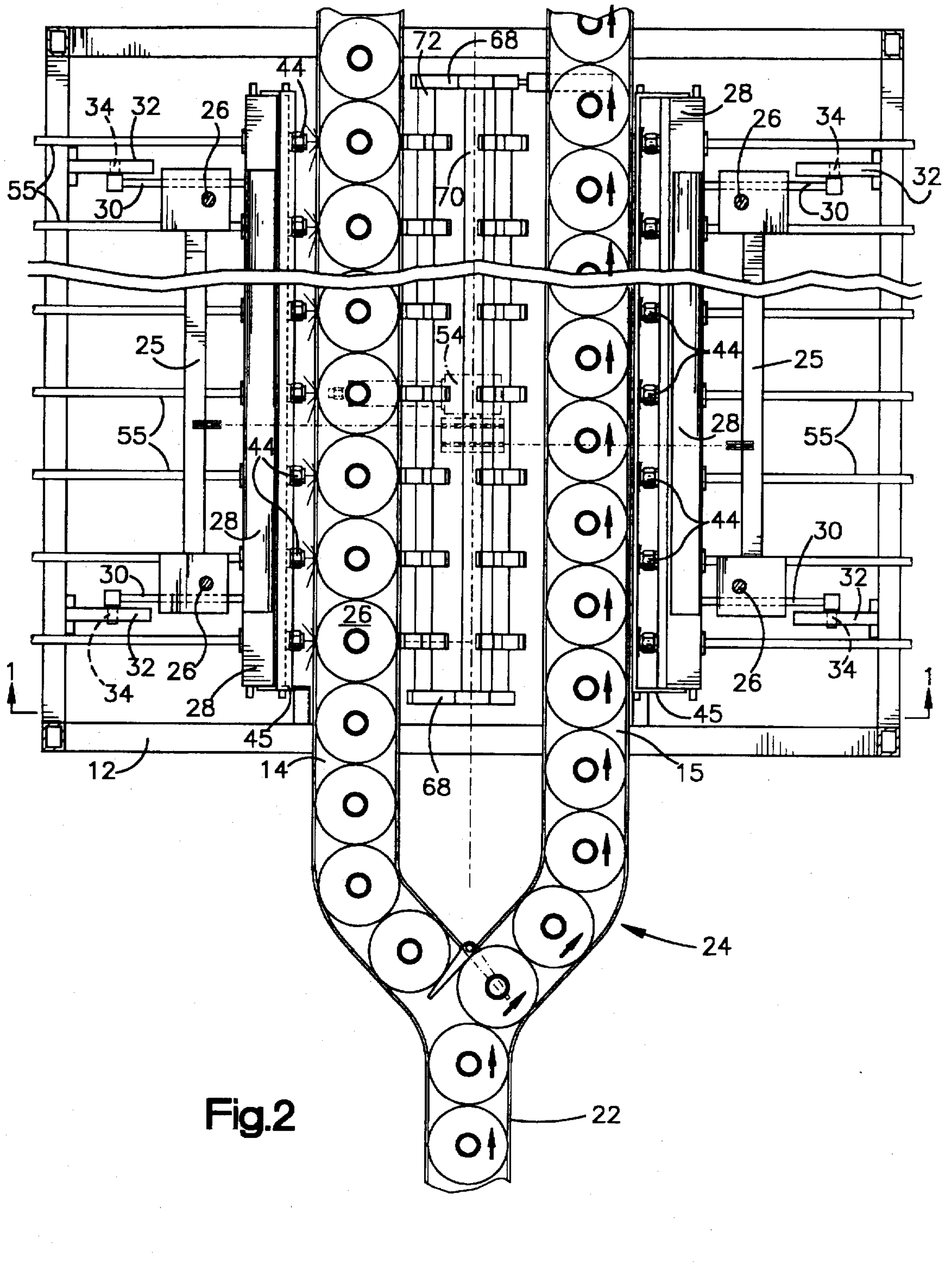
FIG. 2 is a sectional view of the machine as seen from the horizontal plane indicated by the line 2—2 of FIG. 1.
Figure 2A:
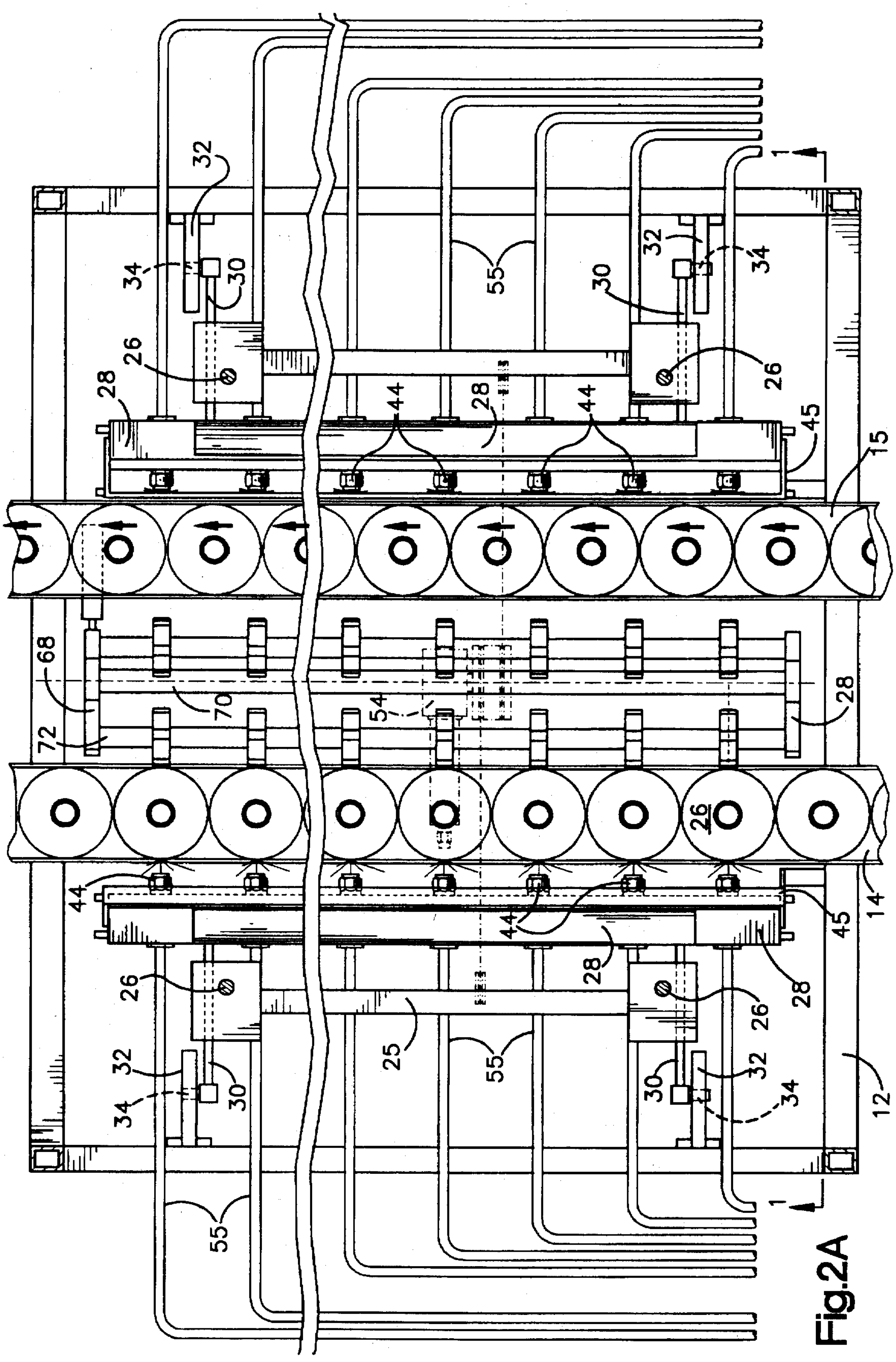
Figure 3:
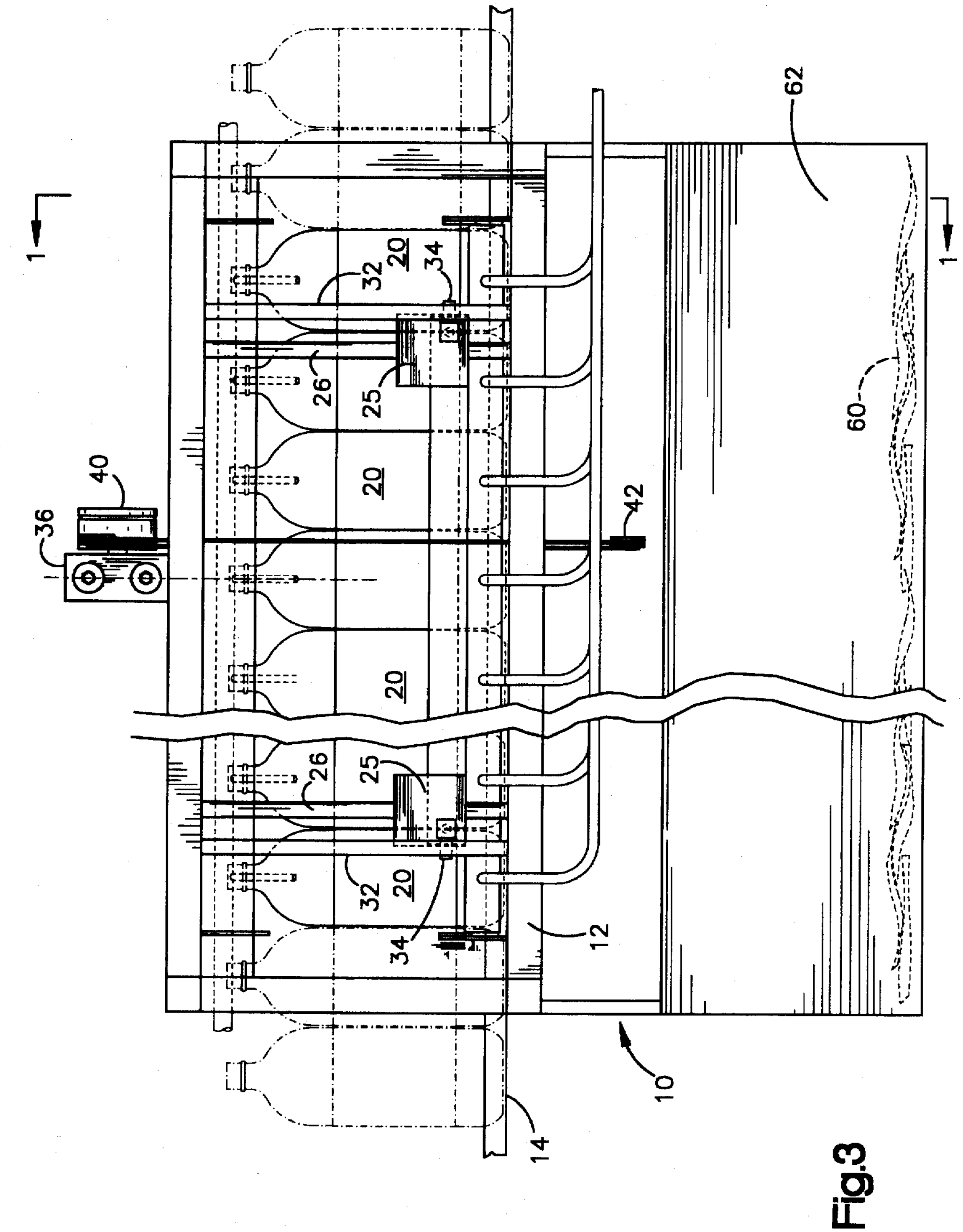
FIG. 3 is a side elevational view of the machine as seen from the plane indicted by the line 3—3 of FIG. 1.

Sets of jet cutters 44 are connected to and supported by the carriers 28. As is best illustrated in FIG. 2, the cutters of a set are uniformly spaced with each longitudinally aligned with the bottle label to be cut when the machine is in use.

Figure 6:
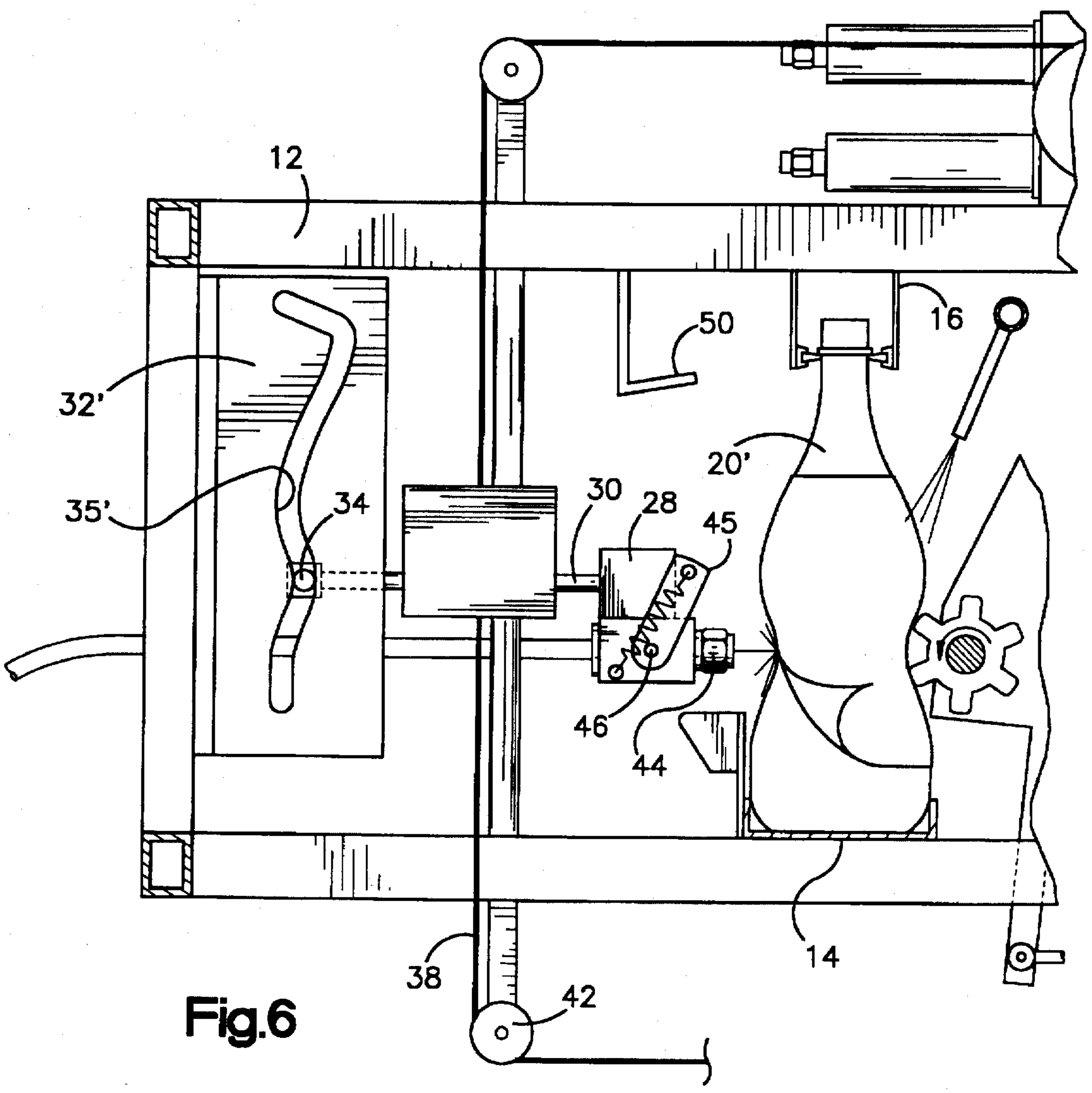
FIG. 6 is a fragmentary view as seen from the plane of FIG. 1 and on an enlarged scale and showing a contoured cam for controlling the lateral positioning of the cutters.
Figure 7:
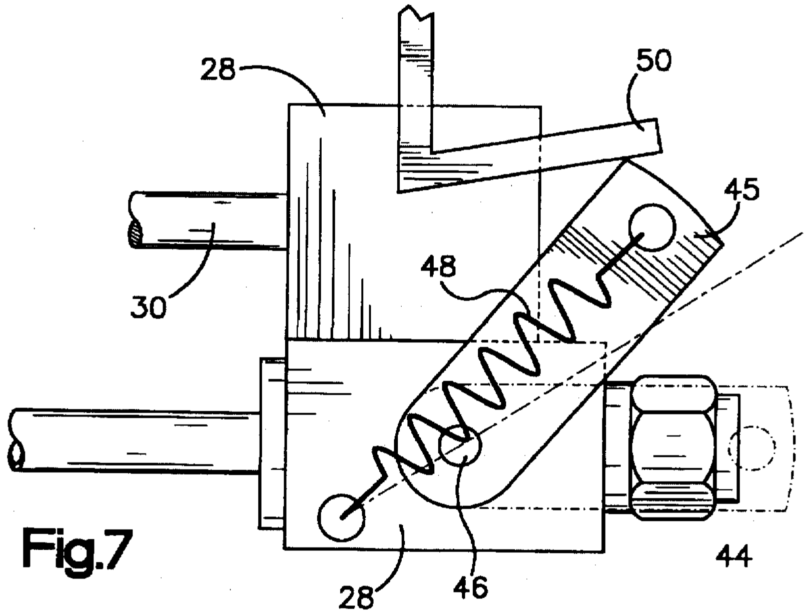
FIG. 7 is an enlarged fragmentary view showing the cam action for shifting a deflector from its jet exposed position shown in solid lines to its jet blocking position shown in phantom.

Each work station includes a deflector 45. Each deflector is pivotally mounted on an associated one of the cutter carriers 28 by pivots 46. Each deflector 45 has a jet exposed position as best seen in FIG. 6. In the jet exposed position, a spring 48 biases the deflector against the carrier 28. An upper deflector cam 50 is provided. As is best illustrated in FIG. 7, as the carrier 28 reaches the top of its travel, the deflector 45 engages the upper deflector cam 50, causing it to rotate about its pivot 46 until the spring 48 passes over center and causes the deflector 45 to move into a jet blocking position as shown in phantom lines in FIG. 7. When one of the carriers 28 reaches a lower end of its vertical travel, a lower deflector cam 52 coacts with the deflector to shift it to its jet exposed position in an action illustrated in the left-hand station of FIG. 1.

A single high pressure pump 54 is provided. The preferred pump is a 5600 psi pump manufactured by Flare International Corporation of Kent, Wash., Model 5-X5-40. This pump is a constantly operating high pressure pump which is connected to the cutters via conduits 55 such that during use each of the cutters is constantly emitting a high pressure water jet for effecting differential label cutting.

Figure 4:
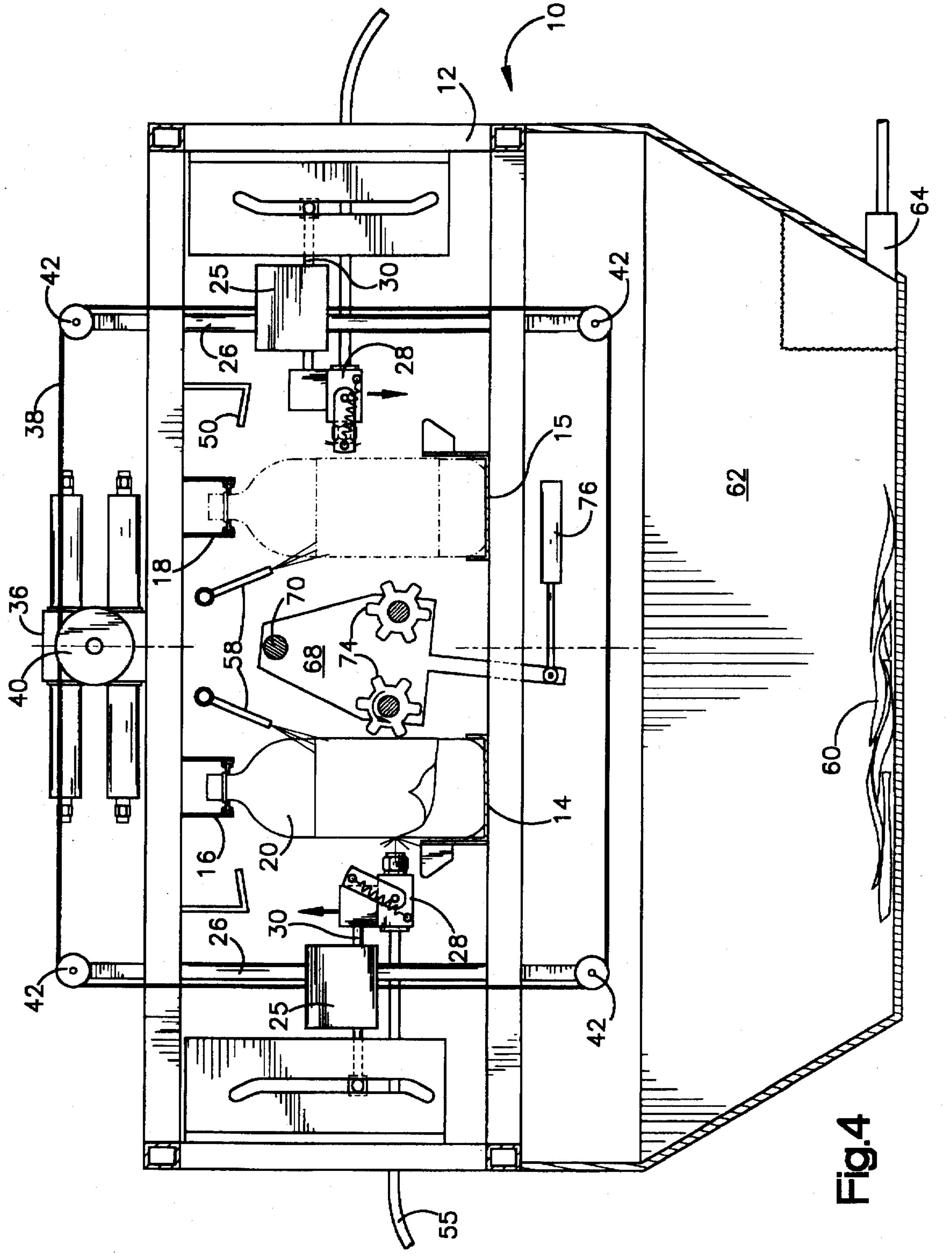
FIGS. 4 and 5 are views corresponding to FIG. 1 showing the machine in different stages of operation.

Sets of flush nozzles 58 are provided. Each flush nozzle is aligned, longitudinally of the tracks 14, 15, with an associated one of the cutters 44. As is suggested by the illustrations of FIGS. 1, 4 and 5, the fluids emitted by the flush nozzles 58 are effective to assist in removing cut labels and flushing the labels 60 into a collection tank 62. Water from the cutters and the flush nozzle also obviously flows into the tank and is drained off through an outlet 64.

A frictional label stripper assembly 66 is provided. The assembly includes a spaced pair of support plates 68, pivotally mounted on a shaft 70. A pair of stripper shafts 72 are journaled in the support plates 68. Sets of frictional finger elements 74 are respectively carried by the shafts 72. Each of the elements is aligned with an associated cutter and, when in use, immediately below an associated flush nozzle for assisting in label removal.

Figure 5:
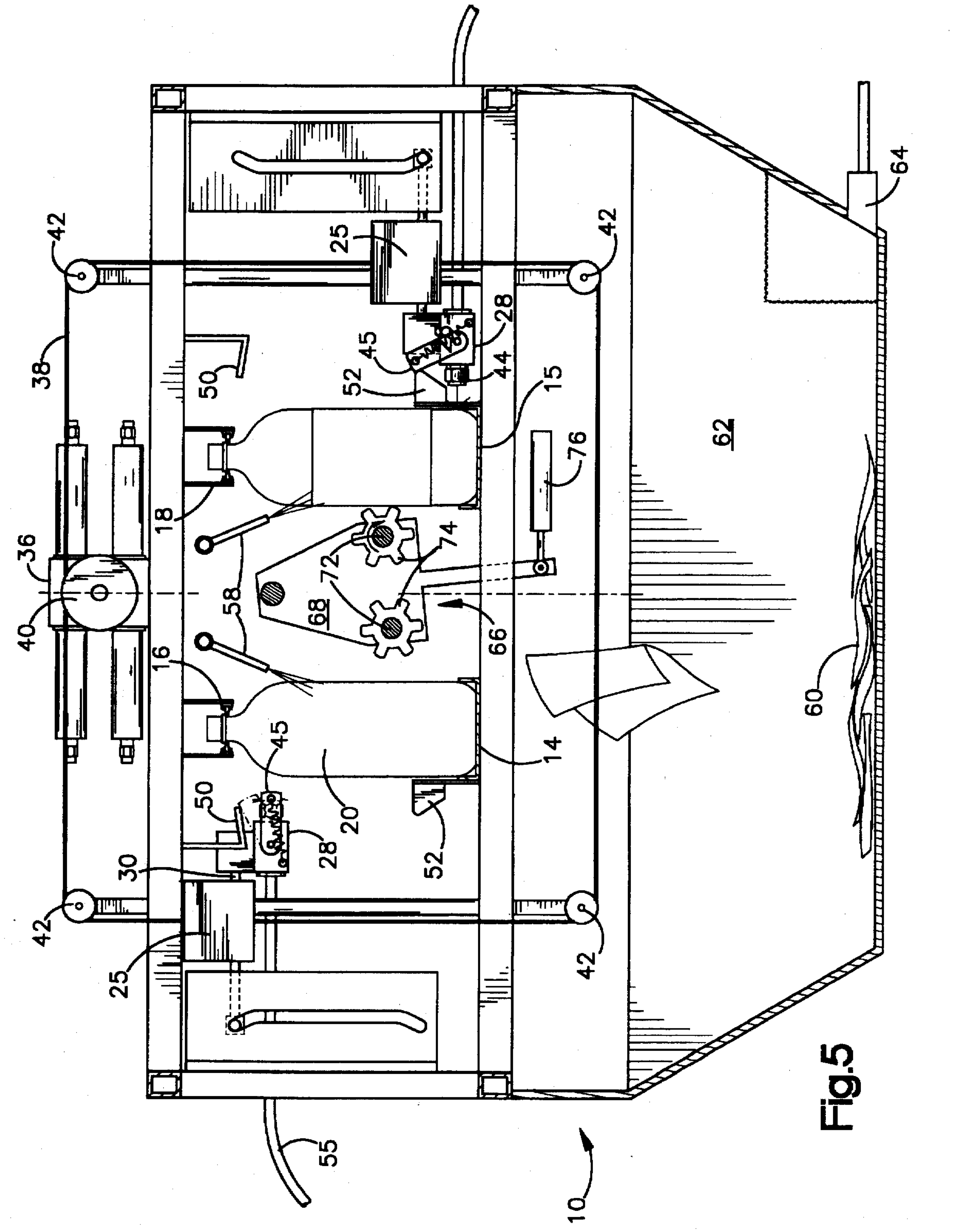

The stripper assembly 66 includes flux cylinder 76 for selectively moving the assembly between the position shown in FIG. 1 for participating in label removal from the left-hand station to the position shown in FIG. 5 for participation in label removal in the right-hand station.

Referring now to FIG. 6, a bottle 20, having other than cylindrical walls is illustrated. To maintain uniform spacing between the cutters 44 and the label being cut, a modified cam 32' is provided. As an examination of FIG. 6 will show, the cam slot 35' is contoured to a figuration complemental to the contour of the bottle 20'. Accordingly, as the carder 28 is elevated, coaction of the cam follower 34 and the cam slot 35' will maintain the jet cutters 44 uniformly spaced from the label being cut.

Operation

In operation a set of bottles 20 to be delabeled are fed from the conveyor 22 via the switch 24 onto the track 14. Bottle feeding continues until bottles of a set having a number equal to the number of cutters 44 are respectively aligned with the cutters. Commencing with the start position of FIG. 1, the actuator output 40 is rotated counterclockwise to move the left-hand carrier 28 from the position of FIG. 1 through the position of FIG. 4 to the stop position of FIG. 5, while concurrently cutting the labels of each bottle of the positioned set, from the bottom, as illustrated in FIG. 1, to the top, as illustrated in FIG. 5. As the left hand carrier approached the FIG. 5 position coaction of the left station upper cam 50 and the carrier 28, moved the carrier from its jet exposed or retracted position to its diverter or blocking position. If desired, as the left hand carrier is elevated, the flush nozzles 58 of the left-hand station will also operate and the left-hand shaft 72 will rotate counterclockwise as illustrated by the arrows in FIGS. 4 and 5 such that the finger elements 74 assist in removing labels.

Once the mechanism has reached the position of FIG. 5, the actuator is stopped. The lower deflector cam of the right-hand station 52 has pivoted the jet deflector 45 of the right-hand station from its blocking to its jet exposed position. Concurrently with the shifting of the deflector of the left hand station from its jet exposed to its blocking position, the frictional stripper assembly cylinder 76 is operated to shift the assembly from the position of FIGS. 1 and 4 to the position of FIG. 5.

In the meantime and concurrent with the vertical cutting traversals of the left-hand station's cutters, a set of bottles has been fed to the right-hand station through movement indicated by the arrows in FIG. 2 to register a set of to-be-delabeled bottles with the cutters 44 of the right-hand station. The actuator 36 is now operated such that its output 40 is driven in a counterclockwise direction causing the right-hand set of cutters 44 to rise, cutting labels from the bottles in the right-hand station. Concurrently, another set of bottles to be delabeled are slid into the left-hand station pushing the delabeled bottles from that station.

As the actuator output 40 rotates in a counterclockwise direction and elevates the right-hand station cutters through their label cutting actions, the left-hand stations carrier 28 and associated parts descend from the position of FIG. 5 back to the position of FIG. 1 whence the cycle repeats.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

We claim:

1. A method of removing tubular labels from a set of aligned bottles comprising:

a) aligning each of a set of fluid jet emitting cutters with a lower end of a label on an associated upright bottle;

b) cutting the labels by relatively moving each bottle and the associated cutter generally vertically while directing a differential fluid cutting jet of liquid against the label of the associated bottle along a transverse path from a lower to an upper end of the label to cut the label from its lower to its upper end thereby assuring a complete cut of the label from its lower to its top end; and, c) removing the cut labels from the bottles.

2. The method of claim 1 wherein a set of label removal streams of fluid are directed against the labels and the bottles at locations substantially diametrically opposed from the paths relative to the bottles to assist in the label removal step.

3. The method of claim 1 further including engaging each label being cut with a moving frictional element at locations spaced from the paths to assist in the label removal step.

4. The method of claim 3 wherein frictional element engagement step includes rotating the elements.

5. The method of claim 1 further including the step of relatively moving each bottle and the associated cutter generally horizontally concurrently with the generally vertical relative movement and thereby tracing the contour of the bottle to maintain cutter to associated bottle spacing substantially constant.

6. The method of claim 1 further including:

a) feeding a plurality of the sets in an inline row along a path of travel;

b) performing the aligning step in each of a set of cutting stations by feeding the sets from the row sequentially and alternately into a spaced pair of station rows;

c) performing the cutting step along one of the station rows;

d) removing the cut labels from the one station row;

e) feeding the now delabeled objects from the one station row;

f) performing the cutting step along the other of the station rows;

g) removing the cut labels from the other station row;

h) feeding the now delabeled objects from the other station row; and, i) thereafter and alternatively repeating steps c, d and e and then f, g and h.

7. The method of claim 6 wherein label removal streams of fluid are directed against each of the labels and their bottles at locations each substantially diametrically opposed from the label cutting of the bottle against which the stream is directed to assist in the label removal step.

8. The method of claim 6 further including engaging each label with a moving frictional element at a location spaced from the severing of the engaged label to assist in the label removal step.

9. The method of claim 8 wherein frictional element engagement step includes rotating the element.

* * * * *